United States Patent [19]
Keller

[11] 3,805,715
[45] Apr. 23, 1974

[54] METHOD FOR DRYING SLUDGE AND INCINERATING ODOR BODIES

[75] Inventor: Frederick R. Keller, Idaho Falls, Idaho

[73] Assignee: The United States of America as represented by the United States Atomic Energy Commission, Washington, D.C.

[22] Filed: Oct. 26, 1972

[21] Appl. No.: 301,036

[52] U.S. Cl. ................................. 110/8 R, 110/15
[51] Int. Cl. ............................................ F23g 5/04
[58] Field of Search ............... 110/7 R, 7 S, 8 R, 15

[56] References Cited
UNITED STATES PATENTS

| 3,625,165 | 12/1971 | Ishigaki | 110/7 |
| 3,589,313 | 6/1971 | Smith et al. | 110/8 |
| 3,272,740 | 9/1966 | Gitchel et al. | 110/8 X |
| 3,319,586 | 5/1967 | Albertson et al. | 110/8 |
| 3,472,186 | 10/1969 | Osterman | 110/15 X |

*Primary Examiner*—Kenneth W. Sprague
*Attorney, Agent, or Firm*—John A. Horan; Arthur A. Churm; Robert J. Fisher

[57] ABSTRACT

A process for drying sewage sludge and eliminating the emanating odor bodies achieves very high heat and drying efficiencies. Sewage sludge is dried in a fluidized bed dryer while the odor bodies contained in the off-gases released during the drying of the sludge are eliminated by incinerating them in a fluidized bed incinerator prior to venting to the atmosphere. The hot exit gases from the incinerator are employed to preheat the sewage sludge feed and to preheat the fluidizing air stream for the fluidized bed dryer. The dryer contains a heat exchanger submerged in the fluidized bed which provides the heat for drying from the low-pressure exhaust steam exiting from an extraction turbine. The turbine is driven by high-pressure steam generated in a heat exchanger submerged in the fluidized bed of the incinerator, the condensate and exhaust from the dryer heat exchanger being recycled to the incinerator heat exchanger for generation of the high-pressure steam. The output of the extraction turbine is used to drive air blowers for the two fluidized beds. The fluidized bed incinerator is fluidized with the stream of off-gases and odor bodies from the fluidized bed dryer, the fuel value of the off-gases and odor bodies being effectively used in the incinerator where heat is generated by fuel combustion.

6 Claims, 1 Drawing Figure

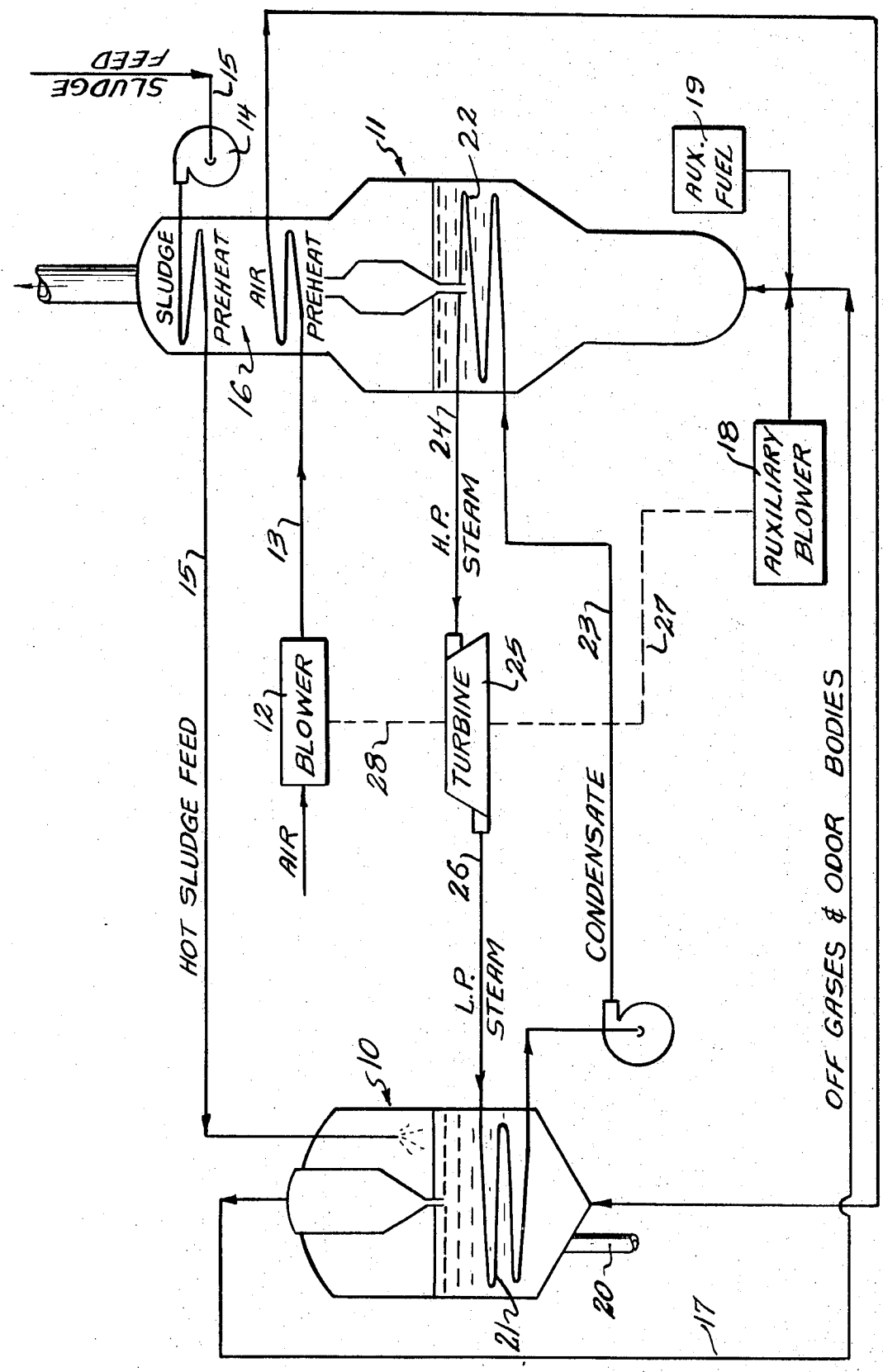

METHOD FOR DRYING SLUDGE AND INCINERATING ODOR BODIES

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

The present invention lies in the field of waste management and pollution control technology and relates to the concentrating and drying of sewage sludges. More particularly, the invention relates to a process for concentrating and drying sewage sludges while eliminating the obnoxious and noxious odor bodies given off during the drying of the sludge. Still more particularly, the invention relates to a process of concentrating and drying sewage sludges in a fluidized bed dryer at very high thermal efficiencies while eliminating the noxious and obnoxious odor bodies by incinerating in a fluidized bed incinerator.

Environmental pollution is now recognized as a very serious and constantly growing problem and in recent years has been at the center of public attention and interest. Disposal of sewage wastes poses a very serious problem of vast proportions, discharge of raw sewage into lakes and streams or other direct release to the environment being totally unacceptable. While treatment of raw sewage provides a partial solution to the problem, waste solutions and sludges generated in industrial processes and municipal sewage treatment plants are also severe sources of pollution. These sewage sludges can be concentrated and dried both to reduce them to a form more easily handled and readily disposed with less environmental impact and to reduce them to a form which may have some beneficial applications such as a low-quality fertilizer as an example. However, in the process of concentrating and drying these sewage sludges, noxious and obnoxious odor bodies are produced and included in the off-gases released from the sewage sludges during the drying process. Since atmospheric pollution from the release of these odor bodies must be avoided, the odor bodies must be removed from the off-gases prior to venting to the atmosphere.

It is an object of the present invention to provide a process for concentrating and drying sewage sludges.

It is a further object of the present invention to provide a process for eliminating the odor bodies from the off-gases released from the sewage sludges during the drying process.

It is an additional object of the present invention to provide a process for concentrating and drying sewage sludges at very high thermal efficiencies while eliminating the odor bodies included in the off-gases released during the drying of the sewage sludge prior to the venting of the off-gases to the atomosphere.

SUMMARY OF THE INVENTION

In accordance with the process of the present invention, sludge is dried at extremely high thermal efficiencies and the odor bodies emanating from the sludge during drying are eliminated by incineration. Both the drying of the sludge and the incineration of the odor bodies are carried out in fluidized beds. The air for fluidizing a fluidized bed dryer is preheated in the stream of hot exit gases from a fluidized bed incinerator. The sewage sludge feed is likewise preheated in the stream of hot exit gases from the fluidized bed incinerator prior to being fed into the fluidized bed dryer. Heat to promote the drying of the sludge is derived from steam passing through a heat exchanger submerged in the bed of the fluidized bed dryer. The steam is generated in a second heat exchanger which is submerged in the bed of the fluidized bed incinerator, the condensate and exhaust from the heat exchanger in the dryer being recycled to the second heat exchanger for regeneration of steam. The stream of off-gases from the dryer including the odor bodies emanating from the drying of the sludge is used as the fluidizing air stream for the fluidized bed incinerator. The fuel values of the off-gases and odor bodies are effectively used for producing heat in the incinerator where the odor bodies are eliminated by incineration prior to venting the exit gases from the incinerator to the atmosphere. The stream of off-gases from the dryer can be supplemented as is necessary with an air stream from an auxiliary blower to insure the proper fluidization of the bed media of the fluidized bed incinerator and with such auxiliary conventional fuel as is necessary to produce high temperatures and insure complete combustion of said odor bodies.

In the preferred embodiment of the present invention, high-pressure steam is generated in the incinerator heat exchanger and is employed to drive an extraction turbine, the low-pressure exhaust steam from the turbine serving as the source of heat in the dryer heat exchanger. The output of the turbine is used to drive blowers for the fluidizing air for the fluidized beds.

DESCRIPTION OF THE INVENTION

An understanding of the features and characteristics of the process of the present invention will be obtained upon reading the following description and with reference to the drawing which shows a schematic diagram of a process in accordance with the present invention.

Referring to the drawing, there is shown a fluidized bed dryer indicated generally at 10 and a fluidized bed incinerator indicated generally at 11. A blower 12 takes in air and forces an air stream through line 13 to the fluidized bed dryer 10 where the air stream from line 13 serves as the fluidizing air for the fluidized bed dryer 10. A section of line 13 lies in the upper portion of the fluidized bed incinerator 11 above the bed media level so that this section of line 13 lies in the stream of hot exit gases 16 from the incinerator 11. The fluidizing air stream for the dryer 10 passing from the blower 12 to the dryer 10 through line 13 is preheated in this section of line 13 by the stream of hot exit gases 16 from the incinerator 11. Sewage sludge to be concentrated and dried in the dryer 10 is fed by pump 14 through line 15 to the fluidized bed dryer 10. Similar to line 13, a section of line 15 lies in the upper portion of the fluidized bed incinerator 11 above the bed media level of the incinerator. The sewage sludge feed being fed to the dryer 10 by the pump 14 is preheated by the hot exit gases 16 of the incinerator 11 as the sludge passes through this section of line 15.

As the sludge is dried in the fluidized bed dryer 10, various volatiles and gases including noxious and obnoxious odor bodies emanate from the sludge. The stream of off-gases from the dryer 10 including these odor bodies passes through line 17 to the incinerator 11, this stream of air and gases acting as the fluidizing air stream for the fluidized bed of the incinerator. The fluidizing stream of off-gases from the dryer can be supplemented as is necessary with an air stream from an auxiliary blower 18 to insure proper fluidization of the bed media of the fluidized bed incinerator 11. The odor bodies are eliminated by incineration in the fluidized bed prior to venting the exit gases 16 from the incinerator 11 to the atmosphere. While the fuel values of the off-gases and odor bodies are effectively used for producing heat in the incinerator 11, an auxiliary fuel source 19 provides such auxiliary conventional fuel as is necessary to produce high temperatures and insure complete combustion of the odor bodies in the incinerator 11. After the odor bodies have been eliminated by incineration, the hot exit gases 16 from the incinerator pass over sections of line 13 and line 15 before they are vented to the atmosphere, thereby preheating the sewage sludge feed and fluidizing air for the dryer as described previously. Concentrated and dried sludge can be removed from the fluidized bed dryer 10 by conventional means, means for removing the dried sludge being represented in the drawing by a tap 20. The concentrated and dried sludge can then be disposed of in a more acceptable manner and with less harm to the environment or put to some beneficial use.

Heat to promote the drying of the sludge is derived from steam passing through a heat exchanger 21 submerged in the bed of the fluidized bed dryer 10. The steam is generated in a heat exchanger 22 submerged in the bed of the fluidized bed incinerator 11, the condensate and exhaust from the heat exchanger 21 in the dryer being recycled through line 23 to the second heat exchanger 22 in the incinerator for regeneration of steam. Both generation of steam in a heat exchanger submerged in a fluidized bed and the liberation of heat from a heat exchanger submerged in a fluidized bed are known and practiced in the art. In the preferred embodiment of the present invention, high-pressure steam is generated in the incinerator heat exchanger 22, and after passing through line 24 to an extraction turbine 25, the high-pressure steam is employed to drive the turbine. The low-pressure exhaust steam from the turbine 25 passes through line 26 to the heat exchanger 21 in the dryer where the low-pressure exhaust steam provides the heat for drying the sludge. The output of the turbine 25 can be used to drive the blower 12 and the auxiliary blower 18 for the fluidizing air for the two fluidized beds, turbine 25 being appropriately connected to the blowers 12 and 18 as represented in the drawing by dotted lines 28 and 27 respectively.

As can be seen from the above description, the process of the present invention provides a method for concentrating and drying sludges while eliminating the noxious and obnoxious odor bodies produced during the sludge drying process, thus removing the problem of air pollution. The process also provides for drying the sludge and eliminating the odor bodies at very high thermal efficiencies and hence economical efficiency. The high thermal efficiencies are obtained by effectively using all the available sources of heat. As the odor bodies are eliminated by incineration in the fluidized bed incinerator, the fuel values in the odor bodies and other off-gases are used to produce heat, thereby reducing the amount of additional auxiliary conventional fuel which must be used. The high temperatures and heat liberated in the incinerator are used to produce steam which eventually serves as a source of heat in the dryer to promote the drying of the sludge. The efficiency of the process is still further increased when high-pressure steam is produced and used to drive an extraction turbine prior to heating the dryer with the low-pressure exhaust steam from the turbine. The output of the turbine can then be used to drive the air blowers for the fluidized beds. The thermal efficiency of the process is further enhanced by use of the heat contained in the hot exit gases from the incinerator to preheat the sewage sludge feed and to preheat the fluidizing air for the dryer which promotes the drying of the sludge.

The embodiments of the invention in which an exclusive property or privilege is claimed are defined as follows:

1. A high-efficiency process for drying sludge and eliminating the emanating odor bodies, comprising:
    a. preheating a sewage sludge feed in the stream of hot exit gases from a fluidized bed incinerator;
    b. feeding said preheated sludge feed to a fluidized bed sludge dryer;
    c. drying and concentrating said sludge in said fluidized bed dryer;
    d. feeding the stream of off-gases and odor bodies emanating from said sludge dryer to said fluidized bed incinerator;
    e. fluidizing the bed media of said fluidized bed incinerator with said stream of off-gases from said sludge dryer; and
    f. incinerating said off-gases and odor bodies in said incinerator, whereby the odor bodies emanating from said sludge and as a result of the drying of said sludge are completely burned and eliminated prior to venting the exit gases from the incinerator to the atomosphere.

2. The process according to claim 1 additionally comprising the steps of:
    supplementing the stream of off-gases from said sludge dryer with an air stream from an auxiliary blower to insure the proper fluidization of the bed media of the fluidized bed incinerator; and
    supplementing said off-gases with auxiliary conventional fuel to produce high temperatures in the incinerator and insure complete combustion of said odor bodies.

3. The process in accordance with claim 2 further comprising the steps of:
    generating steam in a steam-generating heat exchanger submerged in said fluidized bed incinerator;
    passing the steam so generated to a second heat exchanger submerged in said fluidized bed dryer;
    drying said sludge in said dryer with the heat given off from said second heat exchanger; and
    recycling the condensate from the exhaust of said second heat exchanger back to said steam-generating heat exchanger.

4. The process of claim 3 wherein the steam generated in said steam-generating heat exchanger is high-pressure steam, further comprising the additional steps of:
    passing said high-pressure steam to an extraction turbine;
    driving said extraction turbine with said high-pressure steam;

driving air blowers for said fluidized beds with the power output of said extraction turbine; and passing the low-pressure exhaust steam from said extraction turbine to said second heat exchanger in said fluidized bed dryer.

5. The process in accordance with claim 2 further comprising the step of preheating the fluidizing air for the fluidized bed dryer in the stream of hot exit gases from said incinerator.

6. A high-efficiency process for drying sludge and incinerating odor bodies comprising:

a. establishing and maintaining a first fluidized bed of an inert material by passing air upwardly therethrough;

b. generating high-pressure steam in a first heat exchanger submerged in the bed of said first fluidized bed;

c. passing said high-pressure steam to an extraction turbine;

d. driving said turbine with said high-pressure steam;

e. preheating a sewage sludge feed in the stream of hot exit gases from said first fluidized bed;

f. preheating an air feed in the stream of hot exit gases from said first fluidized bed;

g. establishing and maintaining a second fluidized bed of an inert material by passing said preheated air feed upwardly therethrough;

h. feeding said preheated sewage sludge feed to said second fluidized bed;

i. passing low-pressure exhaust steam from said extraction turbine to a second heat exchanger submerged in the bed of said second fluidized bed;

j. drying and concentrating said sludge in said second fluidized bed with the heat given off from said second heat exchanger and said upward transversing preheated air;

k. recycling the exhaust condensate from said second heat exchanger back to said first heat exchanger;

l. driving the air blowers for said fluidized beds with the power output of said extraction turbine;

m. passing the off-gases and odor bodies from the drying and condensing of said sludge in said second fluidized bed to an incinerator portion of said first fluidized bed;

n. supplementing said off-gases and odor bodies with sufficient conventional fuel to insure complete incineration of said odor bodies;

o. incinerating said odor bodies in said first fluidized bed; and p. heating said first fluidized bed and generating said steam by the incineration of said off-gases, odor bodies and supplemental conventional fuel.

* * * * *